Oct. 3, 1967
E. E. HOSEA
3,344,511
TOOLHOLDER AND GRIPPING DEVICE FOR AUTOMATIC TOOL CHANGERS
Filed Feb. 8, 1965
3 Sheets-Sheet 1
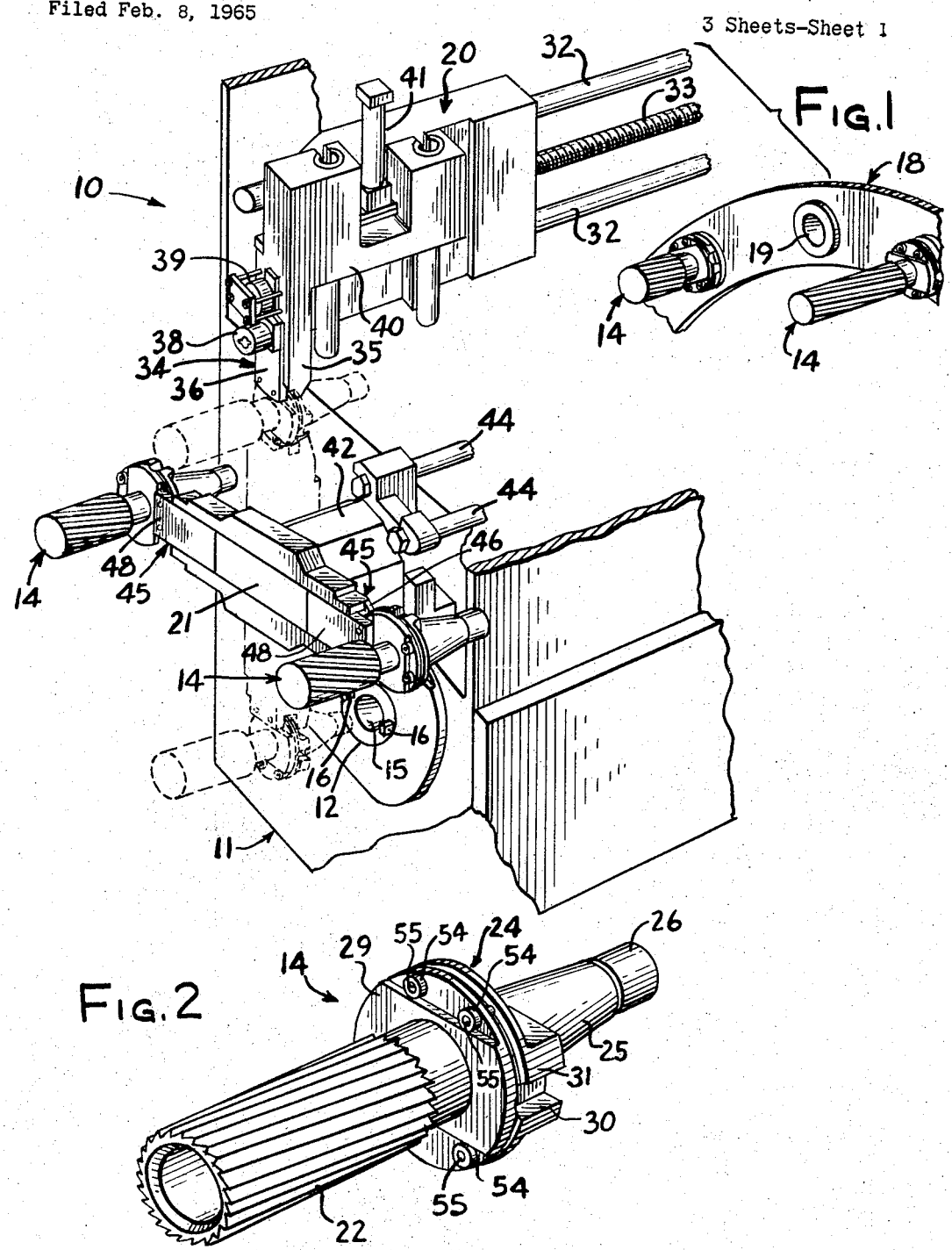
INVENTOR
EVERETT E. HOSEA
by: Wolfe, Hubbard, Voit & Osann
ATTYS.

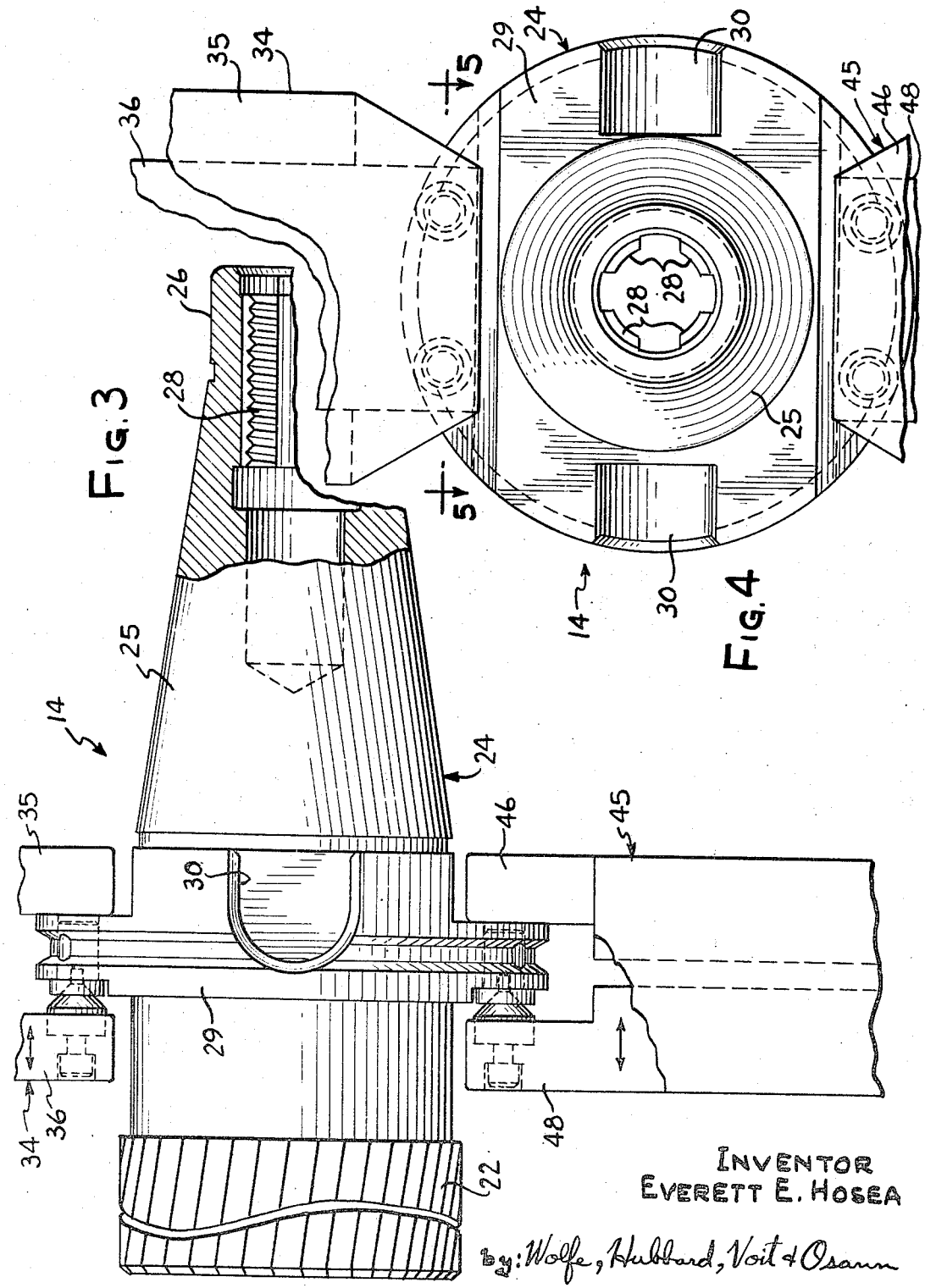

Oct. 3, 1967  E. E. HOSEA  3,344,511
TOOLHOLDER AND GRIPPING DEVICE FOR AUTOMATIC TOOL CHANGERS
Filed Feb. 8, 1965  3 Sheets-Sheet 3

INVENTOR
EVERETT E. HOSEA
by: Wolfe, Hubbard, Voit & Osann
ATTYS.

United States Patent Office 3,344,511
Patented Oct. 3, 1967

3,344,511
TOOLHOLDER AND GRIPPING DEVICE FOR AUTOMATIC TOOL CHANGERS
Everett E. Hosea, Butte des Morts, Wis., assignor to Giddings & Lewis Machine Tool Company, Fond du Lac, Wis., a corporation of Wisconsin
Filed Feb. 8, 1965, Ser. No. 430,795
8 Claims. (Cl. 29—568)

The present invention relates to automatic tool changing apparatus adapted to be used with a machine tool for automatically transferring a succession of tools from a storage area to an operating station and for subsequently returning them to the storage area. More specifically, the invention relates to an improved toolholder and gripping device for an automatic tool changer wherein the toolholder is formed with a generally radial intermediate flange and the gripping device engages the flange with motion substantially parallel to the longitudinal axis of the toolholder.

The operating cycle of an automatic tool changing apparatus often involves an initial transfer of a tool and toolholder from the storage matrix to a transport member and one or more subsequent transfers from the transport member or members to the operating station, as well as the reverse of this sequence. These transfers must be accomplished with precision, without loss of tool orientation and without risk of dropping the tool.

In automatic tool changer apparatus of the type known heretofore, it has been difficult to achieve the foregoing results consistently, for a variety of reasons. The transfer devices may, for example, be required in some instances to handle tool and toolholder units weighing as much as 100 pounds. Slight misalignments or lost motion between the storage device, the transfer devices, and the tool driving means at the operating station may cause faulty transfers. Variations in indexing accuracy of the storage device under different loads may also aggravate the problem.

With the foregoing in mind, it is an object of the present invention to provide an improved toolholder and gripping device for automatic tool changing apparatus which will achieve reliable gripping and transfer of a tool and toolholder despite errors in alignment of the various elements of the tool changing apparatus.

A further object is to provide a toolholder and gripping device of the character set forth which will be susceptible of precise positioning and orientation of the toolholder relative to the gripping device as an incident to actuation of the latter.

Another object of the invention is to provide a toolholder and gripping device as set forth above and further susceptible to positively locking the toolholder in engagement with the gripping device, thereby eliminating likelihood of dropping the tool and toolholder.

Still another object is to provide a toolholder and gripping device for automatic tool changing apparatus and possessing a substantially greater effective life than the individual tool elements used therewith.

Other objects and advantages will become apparent as the following description proceeds, taken in conjunction with the accompanying drawings, in which:

FIGURE 1 is a fragmentary perspective view of the operative portion of a typical automatic machine tool changing apparatus embodying the present invention.

FIG. 2 is a perspective view of an illustrative toolholder and tool adapted for operation in the apparatus of FIG. 1.

FIG. 3 is an enlarged fragmentary elevational view illustrating the toolholder and tool of FIG. 2 in engagement with gripping devices also embodying the invention.

FIG. 4 is an end view of the toolholder and gripping devices of FIG. 3, as seen from the right-hand end of the toolholder.

Figure 5:
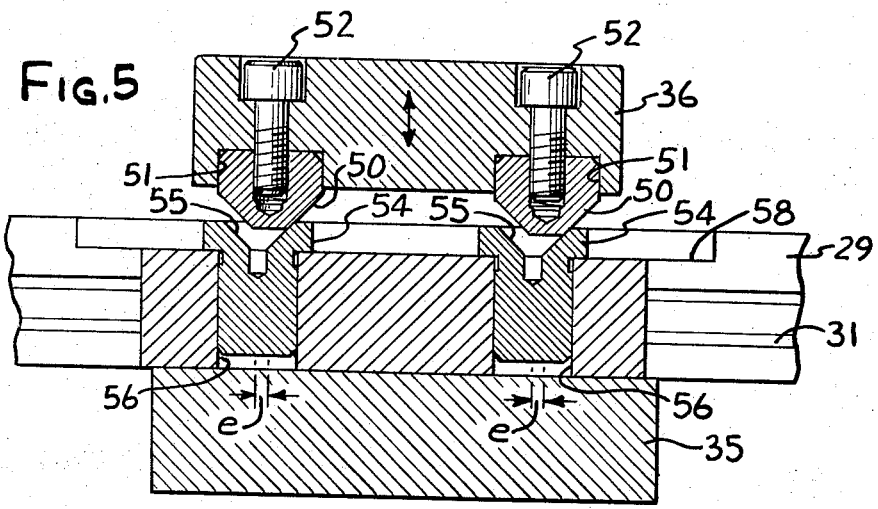
FIGS. 5 and 6 are enlarged fragmentary sectional views through the toolholder and one gripping device, taken in the plane of the line 5—5 in FIG. 4.

While the invention is susceptible of various modifications and alternative forms, certain specific embodiments thereof are shown by way of example in the drawings and will herein be described. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring more specifically to FIG. 1, the invention is there exemplified in an illustrative automatic tool changing apparatus 10 for a machine tool. The apparatus 10 may be incorporated into the organization of a horizontal boring, drilling and milling machine such, for example, as the machine disclosed in Jesse Daugherty application Ser. No. 344,931, filed Feb. 1, 1964, now Patent No. 3,300,856, but it also finds utility in connection with other machine tool configurations. The machine tool is adapted to be operated by automatic control means or by manual means. Automatic operation may be effected by numerical control from a source of command signals derived, for example, from a magnetic or punched paper tape through a control system connected to operate the various power driven components of the machine. In this manner, the illustrative horizontal boring, drilling and milling machine equipped with the automatic tool changing apparatus 10 is adapted to perform a series of machining operations with interspersed tool changing operations, and to perform both the machining and tool changing operations of a program completely automatically from start to finish.

In the present instance, the machine is provided with a headstock 11 vertically movable and positionable on guideways fixed to a supporting column (not shown). An extensible power driven spindle 12, rotatably and translatably supported in the headstock 11, is adapted to receive and drive a tool 14 such as the one illustrated in FIG. 2. For this purpose, the outer end portion of the spindle 12 is formed with a tapered socket 15 and a pair of circumferentially spaced drive keys 16. The spindle also includes a concentrically mounted drawbolt mechanism (not shown) for retaining the tool 14 in driving engagement therewith.

The automatic tool changing apparatus 10 in this instance comprises a tool storage matrix 18, shown fragmentarily in FIG. 1, adapted to hold a plurality of tools 14 in storage sockets 19 for use in the headstock spindle 12. The matrix is rotatably supported on the machine in any suitable manner and is adapted to be indexed so as to present any selected tool to a transfer station (not shown in detail). The apparatus 10 also includes a translatable shuttle 20 and a rotatable tool exchange arm 21, both mounted on the headstock and adapted to shift selected tools between the transfer station at the matrix and an operating station at the machine spindle.

The tool 14, as shown in FIGS. 2 and 3, is illustrative of the large selection of tools adapted to be stored in the matrix 18. In this instance, the tool comprises a milling cutter 22 mounted in a toolholder 24. The latter is formed with a tapered mounting shank 25 adapted to fit the tapered socket 15 of the spindle. The inner end portion 26 of the shank 25 has means such as internal threads 28 for engaging the spindle drawbolt. The toolholder 24 includes a radial flange 29 situated between the cutter 22 and tapered shank 25. The flange 29 is advantageously utilized by the automatic tool changing apparatus 10 as a gripping area for handling the tool. It includes a pair of circumferentially spaced recesses 30 adapted to receive and engage the spindle drive keys 16. The flange 29 may also have a peripheral V-shaped groove 31 which, in some instances, may be utilized for engagement by peripheral gripping devices.

The shuttle 20 (FIG. 1) is mounted for horizontal movement along a pair of vertically spaced guide bars 32 mounted on the headstock 11 in the plane of the spindle axis. The shuttle may be traversed along the guide bars 32 by means of a power driven screw 33 located between the latter. At its left-hand end (as viewed in FIG. 1), the shuttle 20 is provided with a tool gripping device 34 in the form of a pair of depending opposed jaws 35, 36 movable relative to each other. In this case, the jaw 35 is fixed and of channel cross-section over most of its length except for its free end portion. The jaw 36 is pivotally mounted relative to the channel-shaped jaw 35, being formed as a plate which nestingly interfits the latter (FIGS. 1, 3 and 4). The jaws 35, 36 are normally urged together into gripping position by relatively heavy spring means 38. They may be separated on application of a command signal by means of a hydraulic actuator 39. To accommodate the shuttle for use with a dual matrix having an inner matrix member (not shown) concentric with the matrix 18, the gripping member 34 and its jaws may be mounted on a vertical slide 40. The latter may be shifted vertically on the shuttle 20 as by means of hydraulic actuator 41.

The rotatable tool exchange arm 21 (FIG. 1) is journaled in a housing 42 on the headstock 11. The housing 42 is slidably mounted on guide bars 44 secured to the headstock and may be shifted by means of an actuator (not shown) between the extended operating position shown in FIG. 1 and a park or non-operating position adjacent the face of the headstock. Rotary actuators (not shown) serve to swing the arm to effect a tool exchange between the shuttle and the spindle.

The arm 21 is provided at its ends with identical tool gripping devices 45. Each of the latter comprises a pair of relatively movable opposed jaws 46, 48 adapted to grip the toolholder. In the present instance, the jaws 46 are fixed and their intermediate portions are of generally channel-shaped cross-section. The jaws 48 are pivotally mounted relative to the jaws 46 and adapted to nestingly interfit the channel cross-section of the latter. Spring means within the housing 42 normally urge both sets of the jaws 36, 48 together, and hydraulic means also within the housing 42 are adapted to separate both sets of jaws upon application of an appropriate command signal.

At the start of a tool changing cycle, the matrix 18 will be indexed so as to bring a vacant tool socket 19 to the transfer station. The shuttle 20 is then moved to the matrix transfer station and its gripping jaws 35, 36 opened. The matrix 18 is then rotated to bring a selected tool to the transfer station, the flanges 29 of the non-selected tools simply passing between the jaws 35, 36. When the matrix stops with the selected tool at the transfer station, the shuttle jaws 35, 36 close. The shuttle is then moved along the guide bars 32 away from the matrix, withdrawing the selected tool from the latter and transporting it to the transfer station, shown in broken outline in FIG. 1, spaced in front of the headstock.

During this time, the spindle 12 carrying the old tool is shifted axially so as to locate the tool in outwardly spaced relation to the front of the headstock at the broken line position also shown in FIG. 1. This latter position is substantially coplanar with that of the tool held by the shuttle. The spindle, with the old tool, also stops in a predetermined angular position.

The rotatable tool exchange arm 21 is then rotated with both sets of its jaws 46, 48 open, bringing them into straddling relation with the radial flange 29 of the new tool in the shuttle and the old tool in the spindle. The jaws 46, 48 are then actuated to grip the flanges 29 of both the old and the new tool, the shuttle jaws 35, 36 release, the spindle retracts, and arm 21 rotates 180 degrees to exchange the tools. The new tool from the shuttle is thus carried in an arcuate path to a position for insertion into the spindle which advances axially, still in predetermined angular position, to receive the new tool. At the same time, the old tool received from the spindle is carried by the opposite end of the arm 21 in an arcuate path and presented to the shuttle. The jaws 35, 36 of the latter grip the flange 29 of the old tool, the jaws 46, 48 of the exchange arm 21 release, and the arm 21 rotates to a generally horizontal position. The shuttle thereupon returns the old tool to the matrix.

Provision is made in the automatic tool changing apparatus 10 for achieving reliable gripping and transfer of tools despite errors in alignment between the matrix, shuttle, tool exchange arm, and other elements of the apparatus. This is accomplished by constructing each toolholder and gripping device in such a manner that the toolholder will be positively gripped and precisely positioned and oriented in the gripping device as an incident to engagement by the latter. In furtherance of such objectives, the gripping flange of the toolholder and one of the relatively movable gripping jaws are fashioned with correspondingly spaced pairs of convex teeth and interfitting concave recesses. The teeth and recesses have interfitting, complementary bearing surfaces which, by reason of their convex-concave relationship, tend to provide a self-centering action when pressed together. In the present instance, the movable jaw of the gripping device is fashioned with a pair of laterally spaced, convex teeth and the radial flange of the toolholder is formed with a corresponding pair of laterally spaced concave recesses engageable by the teeth as an incident to closing of the jaws.

Referring more specifically to FIGS. 3, 5, 6 and 7, it will be noted that the movable jaw 36 of the shuttle gripping device 34 has mounted adjacent its free end a pair of laterally spaced teeth 50 of generally frusto-conical form. In this case, each of the teeth 50 is formed as a hardened steel insert and is precisely seated in a bore 51 in the jaw. Each tooth insert 50 is retained in place as by means of a cap screw 52 inserted through a bore and a counterbore from the opposite face of the jaw 36 and recessed within the latter.

By the same token, the gripping flange 29 of the toolholder 24 is formed in this instance with a pair of laterally spaced bushings 54 having generally frusto-conical recesses 55 spaced the same predetermined distance apart as the teeth 50. The recesses 55 are aligned with the tool axis and include complementary bearing surfaces adapted to engage those of the teeth 50. The bushings 54 may be formed as hardened steel inserts press fit into bores 56 running transversely of the flange 29. Each bushing 54 has an annular shoulder portion at its outer end adapted to seat against a relieved surface 58 machined in the flange 29 with the outer end of the bushing flush with the outer surface of the flange.

Figure 6:
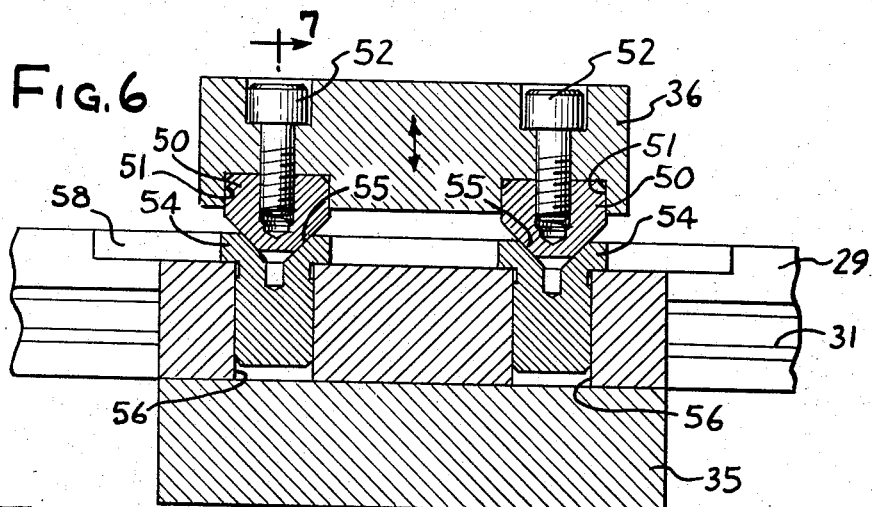
Figure 7:
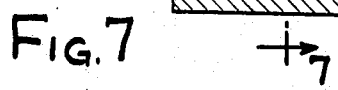
FIG. 7 is an enlarged fragmentary sectional view taken in the plane of the line 7—7 in FIG. 6.

With the structure thus far described, it will be appreciated that prior to engagement between the shuttle gripping device 34 and a toolholder 24, the movable jaw 36 opens sufficiently far to permit the jaws 35, 36 to straddle the radial flange 29 with clearance between the projecting ends of the teeth 50 and the opposed ends of the recess bushings 54. There is also a slight amount of clearance between the inner face of the fixed jaw 35 and the opposed face of the flange 29. Upon actuation of the movable jaw 36 toward gripping position, frusto-conical teeth 50 will enter the mating recesses 55 of the toolholder. Even if there should be some alignment error e, such as shown in FIG. 5, the closure movement of the jaw 36 will tend to cam the toolholder flange 29 to move in the plane of the jaws 35, 36 until the teeth 50 and recesses 55 are precisely centered and aligned, as illustrated in FIGS. 6 and 7. At this point, the jaws 35, 36 are fully engaged with the toolholder flange 29 and the toolholder is precisely positioned and oriented in the jaws 35, 36.

For the purpose of effecting a similar gripping action between the jaws 46, 48 of the tool exchange arm 21 and the toolholder flange 29, the movable jaw 48 is provided adjacent its free end with a pair of laterally spaced projecting teeth 50 similar to those already described above. The teeth 50 are seated in appropriate bores 51 in the jaw 48 and retained as by means of recessed cap screws 52 (FIG. 3). The toolholder flange 29 is similarly provided with a corresponding pair of recess bushings 54 having conical recesses 55 similar to those already described and situated in diametrically opposed relation with the latter (FIGS. 2, 3 and 4). Gripping engagement between the jaws 46, 48 and the toolholder flange 29 is effected in a manner similar to that already described in connection with the jaws 35, 36. In this case, the jaw actuating mechanism of the arm 21 opens the movable jaw 48 far enough to permit the jaws 46, 48 to be swung into straddling relation with the flange 29 with appropriate clearance. The jaws 48 may then be closed, gripping the toolholder after the manner described above and holding it in a predetermined and precisely oriented position in the jaws 46, 48. As will be noted upon reference to FIGS. 3 and 4, the predetermined common lateral dimension of each mating pair of teeth and recesses bears a predetermined angular and radial relation with the tool axis and the threads and recesses 28, 30 on the tool shank 25.

Because the tools are precisely and positively held in the gripping devices 34, 45 of the shuttle 20 and tool exchange arm 21, each tool is safely passed through the 180 degree change in angular position in the process of transfer from matrix to spindle, and the reverse of this when returned to the matrix, despite the effects of tool unbalance, tool weight, or centrifugal force. With such controlled tool positioning and orientation in the gripping devices, each tool is presented to the spindle properly aligned and with the recesses 30 in registration with the drive keys 16.

It will, of course, be appreciated that the convex teeth 50 and concave recesses 55 may take a variety of specific forms provided they interfit in a manner which affords a self-centering action and complementary bearing engagement. The relative positions of the teeth 50 and recesses 55 may also be reversed from those described above. The teeth may, for example, be situated on the toolholder flange 29 and the recesses on the jaw of the gripping device. It will be further appreciated that the teeth 50 and interfitting recesses 55 may be machined directly in the gripping jaw and the toolholder flange. However, in view of the fact that the gripping devices and toolholders may ordinarily be expected to have a longevity many times greater than the individual cutters in the toolholder, it is advantageous to form the teeth 50 and recesses 55 in replaceable inserts of substantially greater hardness than the material of the jaws or toolholder.

I claim as my invention:

1. For use in an automatic tool changing apparatus for a machine tool wherein a succession of tools is transferred between a storage area and an operating station, the combination comprising a tool gripping device having a pair of relatively movable gripping jaws, a toolholder having a radial gripping flange adapted for engagement between said jaws, a pair of laterally spaced convex teeth on one of said jaws projecting toward said other jaw, means on said other jaw defining a flat abutting surface opposite said one jaw, means defining a pair of laterally spaced concave recesses in said radial flange, said teeth and said recesses being laterally spaced by a common predetermined dimension, and means defining complementary bearing areas on said teeth and said recesses susceptible of engagement as an incident to closure of said gripping jaws.

2. For use in a machine tool automatic tool changing apparatus, the combination comprising a pair of tool gripping jaws, one of said jaws being fixed and the other being movable in opposed relation with respect thereto, a toolholder having a longitudinal axis and a radial gripping flange transverse to said axis, said flange being adapted for engagement between said jaws, means on said fixed jaw defining a flat abutting surface opposite said movable jaw, a pair of laterally spaced convex teeth on said movable jaw projecting toward said abutting surface of said fixed jaw, means defining a pair of laterally spaced concave recesses in said radial gripping flange, said teeth and said recesses being spaced substantially the same predetermined distance apart, and means defining complementary bearing areas on said teeth and said recesses susceptible of engagement as an incident to movement of said movable gripping jaw toward said fixed jaw.

3. For use in a machine tool automatic tool changing apparatus adapted to transfer a succession of tools between a storage area and an operating station, the combination comprising a tool gripping device, a toolholder having a radial gripping flange member adapted for engagement by said gripping device, a movable tool gripping member on said tool gripping device, means on said gripping device defining a fixed abutment having a flat surface in opposed relation with said movable tool gripping member, a pair of laterally spaced convex teeth on one of said gripping members, means defining an opposed pair of laterally spaced concave recesses on the other of said gripping members, said teeth and said recesses being spaced apart by a predetermined common lateral dimension and bearing a predetermined angular and radial relation to the axis of the tool, and means defining complementary bearing areas on said teeth and said recesses susceptible of engagement as an incident to relative movement of said gripping members together.

4. For use in a machine tool automatic tool changing apparatus for transferring a succession of tools between a storage area and an operating station, the combination comprising a tool gripping device, a toolholder having a longitudinal axis and a radial gripping flange member transverse to said axis, said flange member being adapted for engagement by said gripping device, a movable tool gripping member on said tool gripping device, means on said gripping device defining a fixed abutment having a flat surface in opposed relation with said movable tool gripping member, a pair of laterally spaced convex teeth mounted on one of said gripping members, a pair of laterally spaced bushings mounted on the other of said gripping members, said bushings having concave recesses disposed opposite said teeth, said teeth and said bushings being spaced apart by a predetermined common lateral dimension bearing a predetermined angular and radial relation to the axis of the tool, and means defining complementary bearing areas on said teeth and said recesses susceptible of engagement as an incident to relative movement of said gripping members together.

5. For use in an automatic tool changing apparatus for a machine tool with a gripping device comprising a pair of opposed jaws one having a pair of laterally spaced projections and the other having an opposed flat abutting surface, a toolholder comprising, in combination, a tapered shank having a longitudinal axis, means adjacent one end of said shank for mounting a cutter, means adjacent the other end of said shank for engagement with a machine tool drawbolt, a radial gripping flange situated adjacent said one end of said shank and disposed transversely of said longitudinal axis, and means defining a pair of laterally spaced concave recesses extending transversely of said flange, said recesses having a predetermined angular and radial spacing relative to said longitudinal axis and being susceptible of positive and precise engagement by the jaws of said gripping device.

6. For use in an automatic tool changing apparatus for a machine tool with a gripping device comprising a pair of opposed jaws one having a pair of laterally spaced projections and the other having an opposed flat abutting surface, a toolholder comprising, in combination, a tapered shank having a longitudinal axis, means adjacent one end of said shank for mounting a cutter, means adjacent the other end of said shank for engagement with a machine tool drawbolt, a radial gripping flange situated adjacent said one end of said shank and disposed transversely of said longitudinal axis, and means defining diametrically opposed pairs of laterally spaced bores extending transversely of said flange, a plurality of bushings disposed in respective ones of said bores, said bushings being formed of material having substantially greater hardness than said flange, and means defining a plurality of concave recesses in respective ones of said bushings, said recesses having a predetermined angular and radial spacing relative to said longitudinal axis and to said cutter and to said drawbolt engagement means and being susceptible of positive and precise engagement by the jaws of said gripping device.

7. For use in a machine tool automatic tool changing apparatus, a gripping device comprising, in combination, a pair of tool gripping jaws, one of said jaws being fixed and the other being movable with respect thereto, said movable jaw having a free end and a pair of laterally spaced bores adjacent said free end, said fixed jaw having a flat surface adjacent its free end opposite said movable jaw, a pair of convex teeth mounted respectively in said bores of said movable jaw and projecting beyond the face of the same toward said fixed jaw, said convex teeth being formed of material having substantially greater hardness than said fixed jaw, and means for retaining said teeth in said bores, said teeth being susceptible of engagement with a portion of a toolholder inserted between said jaws.

8. In an automatic tool changing apparatus for transferring a succession of tools between a storage area and a machine tool operating station, the combination comprising a toolholder having a longitudinal axis and a radial gripping flange transverse to said axis, means defining a pair of laterally spaced bores transversely of said flange, a pair of bushings fixed respectively in said bores, means defining a generally frusto-conical recess centrally of each said bushing, a pair of relatively movable gripping jaws adapted for engagement with said gripping flange by relative movement substantially parallel with said longitudinal axis, means defining a pair of laterally spaced bores adjacent the free end of one of said jaws, means defining a flat abutting surface adjacent the free end of the other of said jaws and facing said one jaw, a pair of generally frusto-conical teeth mounted respectively in said bores and projecting beyond the face of said one jaw toward said other jaw, and means for retaining said teeth in said bores, said teeth and said recesses being disposed for complementary bearing engagement as an incident to closure of said jaws whereby said toolholder is radially and axially oriented with respect to the machine tool operating station.

References Cited

UNITED STATES PATENTS

| | | | |
|---|---|---|---|
| 2,390,293 | 12/1945 | Colson | 294—86 |
| 2,705,658 | 4/1955 | Barckoff | 294—118 |
| 3,129,506 | 4/1964 | Hain | 29—568 |

RICHARD H. EANES, JR., *Primary Examiner.*